No. 765,564. PATENTED JULY 19, 1904.
A. C. F. DANN.
VARIABLE SPEED GEAR.
APPLICATION FILED AUG. 29, 1903.
NO MODEL. 2 SHEETS—SHEET 1.
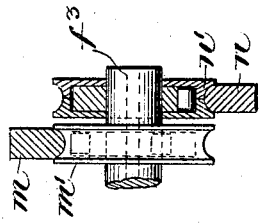
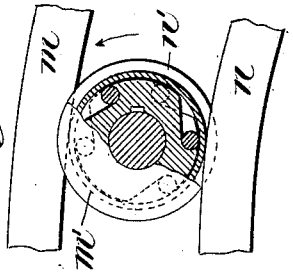
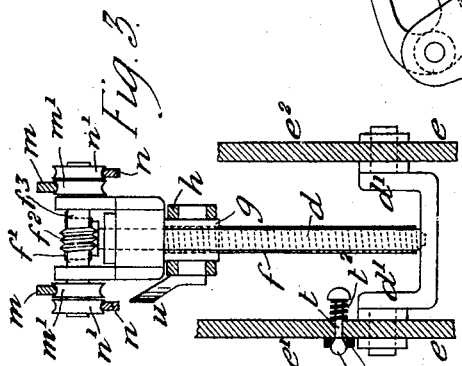
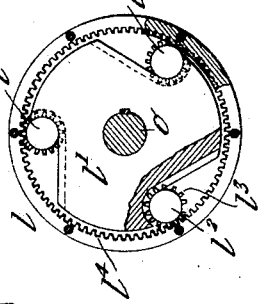
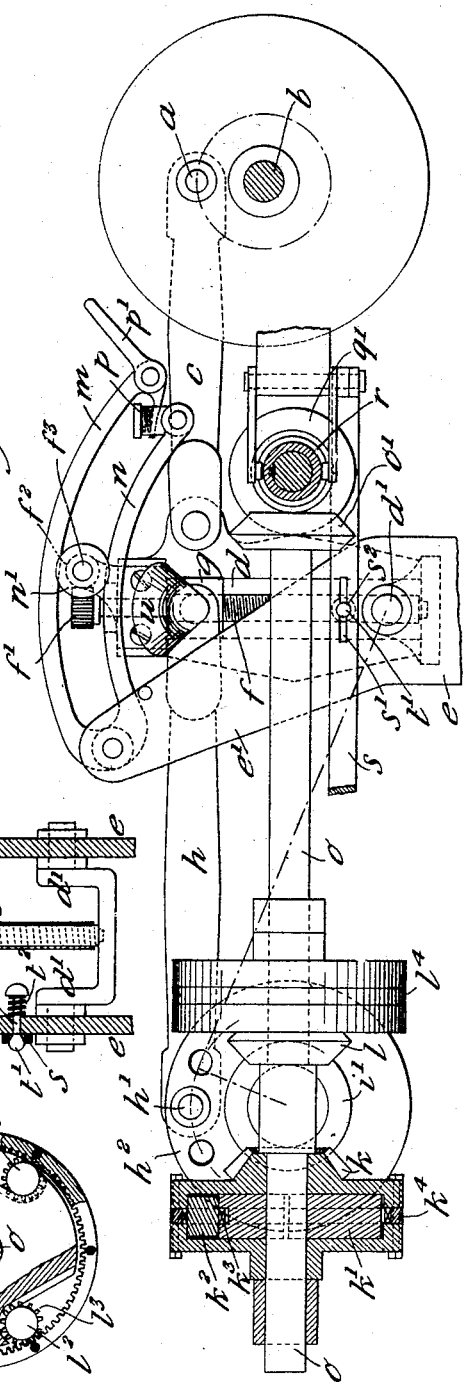
Witnesses
Inventor
A. C. F. Dann

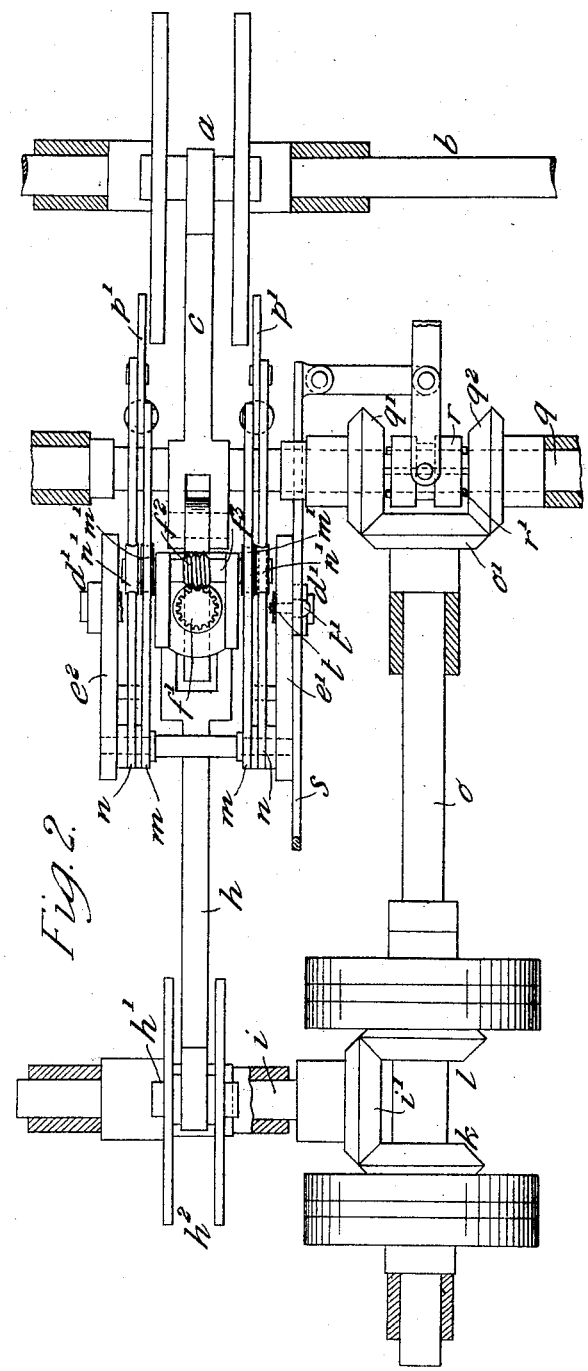

No. 765,564.   Patented July 19, 1904.

UNITED STATES PATENT OFFICE.

AUGUSTUS CARDIGAN FREDERICK DANN, OF SOUTHSEA, ENGLAND.

VARIABLE-SPEED GEAR.

SPECIFICATION forming part of Letters Patent No. 765,564, dated July 19, 1904.

Application filed August 29, 1903. Serial No. 171,180. (No model.)

*To all whom it may concern:*

Be it known that I, AUGUSTUS CARDIGAN FREDERICK DANN, a subject of the King of Great Britain and Ireland, residing at 54 St. Augustine road, Southsea, in the county of Hants, England, have invented certain new and useful Variable-Speed Gear, of which the following is a specification.

This invention relates to improved means for gearing a driving-shaft to a shaft driven therefrom so as to vary the speed of the latter continuously between zero and its maximum speed and to clutches and link motions used in connection therewith, but which may also be used for other purposes. For this purpose a crank on the driving-shaft is connected by a connecting-rod to a point on a link which is pivoted so as to rock in fixed bearings. A block is mounted on the link so as to be capable of sliding thereon and is connected by a connecting-rod to a crank on a shaft parallel to the driving-shaft. Keyed on one end of the intermediate shaft is a bevel-wheel which gears between two bevel-pinions loosely mounted on the shaft to be driven and forming members of a pair of free roller-and-pawl clutches. The pivoted link is rocked through a definite angle by the rotation of the driving-shaft, and the crank on the intermediate shaft is thus also rocked through an angle the value of which depends on the amplitude of the motion of the sliding block—*i. e.*, on the distance of the sliding-block axis from the axis of the link-pivot. As the bevel-wheel on the intermediate shaft is reciprocated rotationally the clutches on the driven shaft successively turn the latter each through an angle equal to the angular displacement of the intermediate shaft in the case of miter-gearing, so that when the sliding-block axis and the axis of the link-pivot are coincident the speed of rotation of the driven shaft will be zero and will be continuously increased as the sliding block is continuously moved from that position.

The apparatus provided for altering the position of the sliding block, which also forms part of the present invention, will be hereinafter described with reference to the accompanying drawings, in which—

Figure 1 is an elevation, partly in section, showing the method of gearing which forms part of the present invention. Fig. 2 is a plan, partly in section. Fig. 3 is a part transverse section showing the gearing for operating the sliding block; Fig. 4, a detail showing the form of clutch preferably used for transmitting the motion from the intermediate to the driven shaft; and Figs. 5 and 6 are detail views on a larger scale, showing the setting-gear by which the variation in the speed is controlled.

Referring to the figures, a crank $a$ on the driving-shaft $b$ is connected by connecting-rod $c$ to a lug on a slotted link $d$, the lower end of which is fixed to trunnions $d'$, mounted in bearings in the standard $e$. The central part of the slot is occupied by a screw $f$, on which travels between the faces of the slots as guides a block $g$, which is connected by a connecting-rod $h$ to a pin $h'$, secured in holes near the edges of a pair of disks $h^2$, which are keyed on an intermediate shaft $i$, supported in bearings parallel to the driving-shaft. The disks are provided with series of holes, in any pair of which the pin $h'$ can be fixed, and by this means the operative parts of the gear-wheels, which are actuated by the motion of the crank $h'$, can be altered, so that as long as there are even a few teeth unbroken the gearing is not affected detrimentally. On the end of the shaft $i$ is keyed a bevel-wheel $i'$, which gears between two bevel-pinions $k\ l$, loosely mounted on the shaft $o$, which is required to be driven. The bevel-pinions $k\ l$ are each formed integrally with or fixed to one element of a clutch, the other elements of which, $k'\ l'$, are keyed on the shaft $o$. The clutches are preferably of the roller type, in which the rollers $k^2\ l^2$ have central bands of teeth $k^3\ l^3$ projecting beyond the surface of the rollers and engaging with corresponding bands of teeth $k^4\ l^4$ in the inner periphery of the clutch-shells $k\ l$. The inclined surfaces on the fixed elements $k'\ l'$ of the clutches are slotted to a sufficient depth and distance along their length to clear the teeth on the rollers for all positions of the latter. By thus gearing the rollers to the loose element of the clutch the rollers are compelled to roll, which prevents the formation of flat portions on their surfaces.

As the shaft $i$ is reciprocated by the motion of the connecting-rod $h$ the rollers on the two clutches come into operation alternately, and the shaft $o$ is rotated in the same direction during both the forward and the backward movement of the connecting-rod $h$, so that with miter-gearing the driven shaft $o$ would, during each revolution of the driving-shaft $b$, be turned through an angle equal to twice that through which the intermediate shaft $i$ is reciprocated. The latter angle can be varied by varying the throw of the adjustable crank to which the rod $h$ is connected—i. e., by altering the position of the block $g$ relative to the bearings of the pivoted link $d$.

A single clutch may be used instead of the double-acting clutch described; but in this case the drive would be an intermittent one.

The motion of the sliding block on the rocking link is automatically accomplished by the motion of the link itself by means of an apparatus which will now be described, and this apparatus can be used apart from the speed-gear described and for other purposes than that of altering the speed ratio between two shafts.

Motion is communicated to the screw $f$ through a worm-wheel $f'$, fixed thereon and gearing with a worm $f^2$ on the shaft $f^3$. Fixed to or forming extensions of the standards $e$ are arms $e'$ $e^2$, at the upper ends of each of which are pivoted a pair of curved arms $m\,n$, which embrace the shaft $f^3$. The curve of the under edge of each of the upper arms $m$ and of the upper edge of each of the lower arms $n$ are struck from the pivotal axis of the link $d$, and these edges are arranged to bear, respectively, on the surfaces of the free members of two clutches $m'\,n'$, the fixed members of which are keyed or otherwise fixed to the shaft $f^3$, when the spring $p$, which normally holds the two arms apart, so as to keep them out of engagement with the free clutches, is compressed by means of the lever $p'$, which may be conveniently operated from a pedal.

When the arms $m\,n$ are in engagement with the clutches $m'\,n'$, respectively, and the link $d$ is rocked on its bearings by the connecting-rod $c$, one of the clutches operates during the forward motion of the link and the other on the backward motion to rotate the shaft $f^3$ in the same direction. By this means the block $g$ is moved, for example, upward along its guides when the curved arms pivoted on the arm $e'$ are in operation and is moved in the opposite direction when the curved arms which are pivoted on the arm $e^2$ are in operation. By this apparatus, therefore, the block $g$ can be automatically moved in a continuous manner away from or toward the axis about which the link $d$ is rocked, and consequently the angle through which the intermediate shaft $i$ is reciprocated can be varied continuously from zero, when the axis of the block $g$ coincides with the axis of the link $d$, to a maximum value, when the block is at the other end of its range.

The shaft $o$ may be geared through a reversing-clutch to a shaft $q$, parallel to the driving-shaft, the clutch-gearing consisting of a bevel-wheel $o'$, keyed on the end of the shaft $o$ and gearing between two bevel-pinions $q'$ $q^2$, loosely mounted on the shaft $q$, to which they can be alternatively connected by means of a clutch-sleeve $r$, sliding on a feather on the shaft $q$ and having pins $r'$ at either end, which engage with corresponding holes in either of the pinions $q'$ $q^2$.

The lever $s$, by which the reversing-clutch is operated, is preferably provided with an automatic locking device which, while enabling the reversing-clutch to be disengaged on either side at any speed, prevents it from being reengaged except at a low speed. This may be accomplished by providing a slot $s'$ in the reversing-lever with a central enlargement $s^2$, which coöperates with a pin $t$, furnished with a head $t'$, adapted to engage in the enlargement $s^2$. This pin passes through the slot and slides in a hole in the standard $e$ and is urged by a spring $t^2$ in the direction which tends to engage the head of the pin in the hole $s^2$. The other end of the pin is placed in the path of the sliding block $g$, so as to be pushed outward against the force of the spring by a suitably-formed plate or projection $u$, attached to the sliding block. This plate can be fixed so as to become operative at any required speed. It will be seen that while the slot permits the reversing-clutch to be disengaged it cannot be thrown over into the reverse position while the driven shaft is rotating at any speed higher than that at which the unlocking device becomes operative.

It will be obvious that the somewhat-intermittent character of the torque by which the driven shaft is rotated can be rendered as continuous as may be desired by multiplying the apparatus herein described, in which case the additional driving-cranks would be spaced round the driving-shaft, so as to eliminate dead-points in the drive.

Having thus described the nature of this invention and the best means I know of carrying the same into practical effect, I claim—

1. In a continuously-variable-speed gear, a rocking link, a driving-crank arranged to oscillate the link, a block mounted to slide in the rocking link, means for adjusting the position of the block in the link in a continuous manner, an intermediate shaft, a crank on said intermediate shaft, a connecting-rod coupling the said crank to the said block, a bevel-pinion fixed on one end of the intermediate shaft, a second shaft, a pair of bevel-wheels loosely mounted thereon and intermeshing one on either side with the said bevel-pinion, and clutches fixed to each bevel-wheel and arranged to rotate the second shaft in one direction only; substantially as described.

2. In a speed-gear, an oscillating shaft, a bevel-pinion fixed on one end of the said shaft, a second shaft extending transversely of the said shaft, a pair of bevel-wheels loosely mounted on the second shaft and gearing one on either side with the said bevel-pinion, a pair of clutches one member of each of which is fixed in position on the second shaft while the other members are loosely mounted on the said shaft and are fixed respectively to the two bevel-wheels, and coöperating pieces by which the clutches are alternately brought into operation as the reciprocating shaft changes its direction of rotation; substantially as described.

3. In a speed-gear, a rocking link, a driving-crank arranged to oscillate the same, a block arranged to slide on the said link, a screw-threaded rod mounted on the link and coöperating with the sliding block, a shaft mounted in bearings on the link and geared with the screw-threaded rod, a pair of clutches mounted on the shaft, a pair of curved arms concentric with the axis of the rocking link, and means for bringing the curved arms into and out of engagement with the clutches each with each; substantially as described.

4. A continuously-variable-speed gear having a driving and a driven element, a reversing-clutch between them, mechanism for actuating said clutch, an automatic locking device arranged to allow reëngagement of the clutch at low speed, and means for preventing reëngagement of the clutch at any speed above a predetermined limit; substantially as described.

In testimony whereof I have signed my name to this specification in the presence of two subscribing witnesses.

AUGUSTUS CARDIGAN FREDERICK DANN.

Witnesses:
   EDWARD GARDNER,
   T. J. OSMAN.